United States Patent
Jasa et al.

(10) Patent No.: US 7,126,616 B2
(45) Date of Patent: Oct. 24, 2006

(54) METHOD AND SYSTEM FOR PROCESSING A NON-LINEAR TWO DIMENSIONAL SPATIAL TRANSFORMATION

(75) Inventors: Tomislav Jasa, Mississauga (CA); Zorawar S. Bassi, Markham (CA); Louie Lee, Richmond Hill (CA)

(73) Assignee: Silicon Optix Inc., San Jose, CA (US)

( * ) Notice: Subject to any disclaimer, the term of this patent is extended or adjusted under 35 U.S.C. 154(b) by 677 days.

(21) Appl. No.: 10/167,375

(22) Filed: Jun. 12, 2002

(65) Prior Publication Data

US 2003/0020732 A1    Jan. 30, 2003

Related U.S. Application Data

(60) Provisional application No. 60/297,240, filed on Jun. 12, 2001.

(51) Int. Cl.
G09G 5/00 (2006.01)
(52) U.S. Cl. .................. 345/645; 345/646; 345/647; 345/648; 345/643; 345/619
(58) Field of Classification Search ............ 345/645, 345/643, 646, 648, 649, 619, 660, 606
See application file for complete search history.

(56) References Cited

U.S. PATENT DOCUMENTS

| | | | |
|---|---|---|---|
| 4,472,732 A | | 9/1984 | Bennett et al. |
| 4,835,532 A | | 5/1989 | Fant |
| 4,908,874 A | | 3/1990 | Gabriel |
| 4,922,544 A | * | 5/1990 | Stansfield et al. .......... 382/166 |
| 4,975,976 A | | 12/1990 | Kimata et al. |
| 5,175,808 A | | 12/1992 | Sayre |
| 5,204,944 A | | 4/1993 | Wolberg et al. |
| 5,475,803 A | * | 12/1995 | Stearns et al. ............. 345/648 |
| 5,568,600 A | * | 10/1996 | Kaba .......................... 345/648 |
| 5,594,676 A | | 1/1997 | Greggain et al. |
| 5,715,385 A | * | 2/1998 | Stearns et al. ......... 340/310.01 |

(Continued)

OTHER PUBLICATIONS

E. Catmull and A.R. Smith, "3-D Transformations of Images in Scanline Order", Computer Graphics, (SIGGRAPH '80 Proceedings), vol. 14, No. 3, pp. 279-285.

(Continued)

*Primary Examiner*—Michael Razavi
*Assistant Examiner*—Daniel Chung
(74) *Attorney, Agent, or Firm*—Charles E. Bruzga; Bruzga & Associates

(57) ABSTRACT

An image transformation method for translating a non-linear 2D geometrical transformation into two separable 1D geometrical transformations first determines the inverse of the 2D geometrical transformation to form an inverse 2D geometrical transformation. Then the method converts the inverse 2D geometrical transformation into an analytical inverted 2D geometrical transformation and separates the analytical inverse 2D geometrical transformation into first and second 1D geometrical transformations. The method then represents said inverse 2D geometrical transformation and first and second 1D geometrical transformations as tensor spline surfaces and then compares an evaluation of said first and second 1D geometrical transformations at each pixel with an evaluation of the analytical inverse 2D geometrical transformation at each pixel. If the error evaluation does not meet a predetermined level of performance then the separation and transformation steps are repeated. Since the method involves one-dimensional spatial transform processing it results in reduced calculations, efficient memory access, and ability to process data in a real-time environment. In-addition, since the method provides a compact representation of the spatial transforms, it can be scaled for a particular level of precision.

20 Claims, 14 Drawing Sheets

U.S. PATENT DOCUMENTS

| | | |
|---|---|---|
| 5,808,623 A | 9/1998 | Hamburg |
| 5,848,199 A | 12/1998 | Naqvi |
| 6,097,855 A | 8/2000 | Levien |
| 2002/0102031 A1* | 8/2002 | Lafage et al. ............... 382/284 |
| 2004/0130669 A1 | 7/2004 | Shin et al. |
| 2004/0156558 A1 | 8/2004 | Kim |

OTHER PUBLICATIONS

P.S. Heckbert, "Fundamentals of Texture Mapping and Image Warping" (Master's Thesis), Department of Electrical Engineering and Computer Science, University of California, Berkeley, 1989.

George Wolberg, "Digital Image Warping", IEEE Computer Society Press 1988.

Silicon Video, svW1 Advanced Display Processor, Product Overview.

Hoppe et al, "Piecewise Smooth Reconstruction" (SIGGRAPH 94 Proceedings) pp. 295-302.

Mortensen, "Geometric Modeling", Wiley 1997.

M.J. D. Powell, "Radial basis function methods for Interpolation to functions of many variables" Fifth Hellenic-European Conference on Computer Mathematics and it's Aplications (Sep. 2001).

Hebson, Robert and Lee, Louie, Comanche Helmet Integrated Display Sighting System Optical Distortion Correction Methodolgy.

* cited by examiner

| Address | Contents | Description |
|---|---|---|
| Base Pointer | | |
| +00 | Offset Segment Spacing | This specifies the spacing of the Offset Segment in number of anchor lines to the next Offset Segment. Value must be from 1 to 255. 32 bit unsigned integer number. |
| +04 | Dos, Cos, Bos, Aos | Offset Segment Coefficients. 32 bit IEEE-754 floating-point numbers. |
| +14 | D1, C1, B1, A1 | Anchor 1 Segment 1 coefficients. 32 bit IEEE-754 floating-point numbers. |
| +24 | D2, C2, B2, A2 | Anchor 1 Segment 2 coefficients. 32 bit IEEE-754 floating-point numbers. |
| +34 | Anchor Spacing | This value specifies the number of lines between Anchor Lines. Value must be from 1 to 2048. For best accuracy use values of $2^n$. 32 bit unsigned integer number. |
| +38 | Interpolation Value | This value is used to interpolate coefficients between anchor values. This is the reciprocal of the Anchor Spacing value. 32 bit IEEE-754 floating-point number. |
| +3C | D1, C1, B1, A1 | Anchor 2 Segment 1 coefficient values. 32 bit IEEE-754 floating-point numbers. |
| +4C | D2, C2, B2, A2 | Anchor 2 Segment 2 coefficient values. 32 bit IEEE-754 floating-point numbers. |
| +5C | Anchor Spacing | This value specifies the number of lines between Anchor Lines. Value must be from 1 to 2048. For best accuracy use values of $2^n$. 32 bits unsigned integer number. |
| +60 | Interpolation Value | This value is used to interpolate coefficients between anchor values. This is the reciprocal of the Anchor Spacing value. 32 bit IEEE-754 floating-point number. |
| +64 | D1, C1, B1, A1 | Next Anchor Segment 1 coefficient values. 32 bit IEEE-754 floating-point numbers. |
| +74 | D2, C2, B2, A2 | Next Anchor Segment 2 coefficient values. 32 bit IEEE-754 floating-point numbers. |
| | Offset Segment Spacing | This specifies the spacing of the first Offset Segment in number of anchor lines to the next Offset Segment. Value must be from 1 to 255. 32 bit unsigned integer number. |
| | Dos, Cos, Bos, Aos | Offset Segment Coefficients. 32 bit IEEE-754 floating-point numbers. |
| | Anchor Spacing | This value specifies the number of lines between Anchor Lines. Value must be from 1 to 2048. For best accuracy use values of $2^n$. 32 bit unsigned integer number. |
| | Interpolation Value | This value is used to interpolate coefficients between anchor values. This is the reciprocal of the Anchor Spacing value. 32 bit IEEE-754 floating-point number. |
| | D1, C1, B1, A1 | Next Anchor Segment 1 coefficient values. 32 bit IEEE-754 floating-point numbers. |
| | D2, C2, B2, A2 | Next Anchor Segment 2 coefficient values. 32 bit IEEE-754 floating-point numbers. |
| --- | | |
| | Anchor Spacing | This value specifies the number of lines between Anchor Segments. Value must be from 1 to 2048. For best accuracy use values of $2^n$. 32 bit unsigned integer number. |
| | Interpolation Value | This value is used to interpolate coefficients between anchor values. This is the reciprocal of the Anchor Spacing value. 32 bit IEEE-754 floating-point number. |
| | D1, C1, B1, A1 | Anchor N Segment 1 coefficient values. 32 bit IEEE-754 floating-point numbers. |
| | D2, C2, B2, A2 | Anchor N Segment 2 coefficient values. 32 bit IEEE-754 floating-point numbers. |

FIG. 14

METHOD AND SYSTEM FOR PROCESSING A NON-LINEAR TWO DIMENSIONAL SPATIAL TRANSFORMATION

This regular application claims priority from provisional U.S. Application No. 60/297,240 filed Jun. 12, 2001.

FIELD OF THE INVENTION

This invention relates to the field of video image processing and more particularly to the processing of a non-linear 2D spatial transformation.

BACKGROUND OF THE INVENTION

Geometric or spatial transformations are operations that redefine spatial relationships between points in an image. Generally, a spatial transformation is defined as a mapping function that establishes a spatial correspondence between all points in the input and output images. Given a spatial transformation, each point in the output assumes the value of its corresponding point in the input image. Common applications for applying a geometric transformation include image distortion correction, compensation of geometrically distorted image projected on non-flat or perpendicular surfaces, and compensation of optical distortions.

Geometric transformation algorithms use simplifications in processing or modeling of the problem in order to simplify implementation. These compromises result in limitations on the complexity of the transformation and/or introduce results that do not match the transformation exactly. One such simplification method is called the two-pass method. This method decomposes a 2D map into a series of 1D maps. Processing geometric transforms in 1D is much simpler than in 2D and allows high optimization of the hardware. A general discussion of image warping, including some prior art techniques mentioned below, can be found in the IEEE Computer Society Press Monograph entitled *Digital Image Warping*, George Wolberg, 1998, which is hereby incorporated by reference.

Much of the current state of the art in image warping is based on techniques used in texture mapping for 3D computer graphics, as well as other specialized methods developed specifically for special effects video. Texture mapping as used in 3D graphics is typically implemented as a non-separable 2D geometric operation. The non-separable methods typically approximate the geometric distortion as a collection of piecewise linear distortions, or focus on perspective mappings. A perspective mapping is useful in 3D graphics as this mapping defines how to render a 3D object to a 2D viewing area, however distortions such as pin/barrel effect and lens aberration present in optical systems cannot be modeled as a perspective mapping. Using piecewise linear representations for the geometric distortions can significantly increase memory requirements.

Due to the complexity of implementing non-separable methods most prior art designs simplify the filtering/interpolation methods used, for example MIP ("multum in parvo") mapping which uses a hierarchy of filtered images is often substituted for complex filtering. The image artifacts created using this simplified filtering are unacceptable for video processing. Other texture mapping methods exploit the fact that in 3D graphics it is often required to warp a single static texture (image) for many different distortions, while in optical processing it is important to be able to warp dynamic images using a single geometric distortion.

Methods specifically developed for video warping are discussed in U.S. Pat. Nos. 5,175,808 to Sayre and 5,204,944 Wolberg et al. These methods are based on a pixel-by-pixel (i.e. look-up tables) representation of the geometric transformation. However, a pixel-by-pixel representation requires a large amount of data storage and does not allow for a simple method of performing manipulations of the geometric transformation (example rotation, scaling translation of an image in addition to the geometric transformation). Other separable methods for geometric transformations are limited to affine or perspective transformations that cannot perform "non-linear" transformations, for example see U.S. Pat. No. 4,835,532 to Fant, U.S. Pat. No. 4,975,976 to Kimata et al., U.S. Pat. No. 5,808,623 to Hamburg, and U.S. Pat. No. 6,097,855 to Levien. Methods that use mathematical models of the spatial transformation and allow the user to adjust the parameters of the model are often limited to affine and perspective warps. As has already been discussed, affine or perspective warps cannot adequately model distortions required for optical systems.

SUMMARY OF THE INVENTION

The invention provides in one aspect, an image transformation method for translating a non-linear 2D geometrical transformation into two separable 1D geometrical transformations, said method comprising the steps of:
(a) determining the inverse of the non-linear 2D geometrical transformation to form an inverse 2D geometrical transformation;
(b) converting the inverse 2D geometrical transformation into an analytical inverted 2D geometrical transformation;
(c) separating the analytical inverse 2D geometrical transformation into a first and second 1D geometrical transformations;
(d) representing said inverse 2D geometrical transformation and said first and second 1D geometrical transformations as tensor spline surfaces; and
(e) comparing an evaluation of said first and second 1D geometrical transformations at each pixel with an evaluation of the analytical inverse 2D geometrical transformation at each pixel and repeat steps (c) and (d) until said evaluation meets a predetermined level of performance.

The invention provides in another aspect an image transformation system for translating a non-linear 2D geometrical transformation into two separable 1D geometrical transformations, said image transformation system comprising:
(a) a processor for determining the inverse of the non-linear 2D geometrical transformation to form an inverse 2D geometrical transformation;
(b) a converter module coupled to the processor for converting the inverse 2D geometrical transformation into an analytical inverted 2D geometrical transformation;
(c) a separator module coupled to the processor for separating the analytical inverse 2D geometrical transformation into a first and second 1D geometrical transformations;
(d) a representation module for representing said inverse 2D geometrical transformation and said first and second 1D geometrical transformations as tensor spline surfaces; and
(e) a comparison module for comparing an evaluation of said first and second 1D geometrical transformations at each pixel with an evaluation of the analytical inverse 2D geometrical transformation at each pixel and repeat steps (c) and (d) until said evaluation meets a predetermined level of performance.

Further aspects and advantages of the invention will appear from the following description taken together with the accompanying drawings.

BRIEF DESCRIPTION OF THE DRAWINGS

In the accompanying drawings:

FIG. 14 illustrates data produced as a result of the embodiment of FIG. 13.

DETAILED DESCRIPTION OF THE INVENTION

Figure 1:
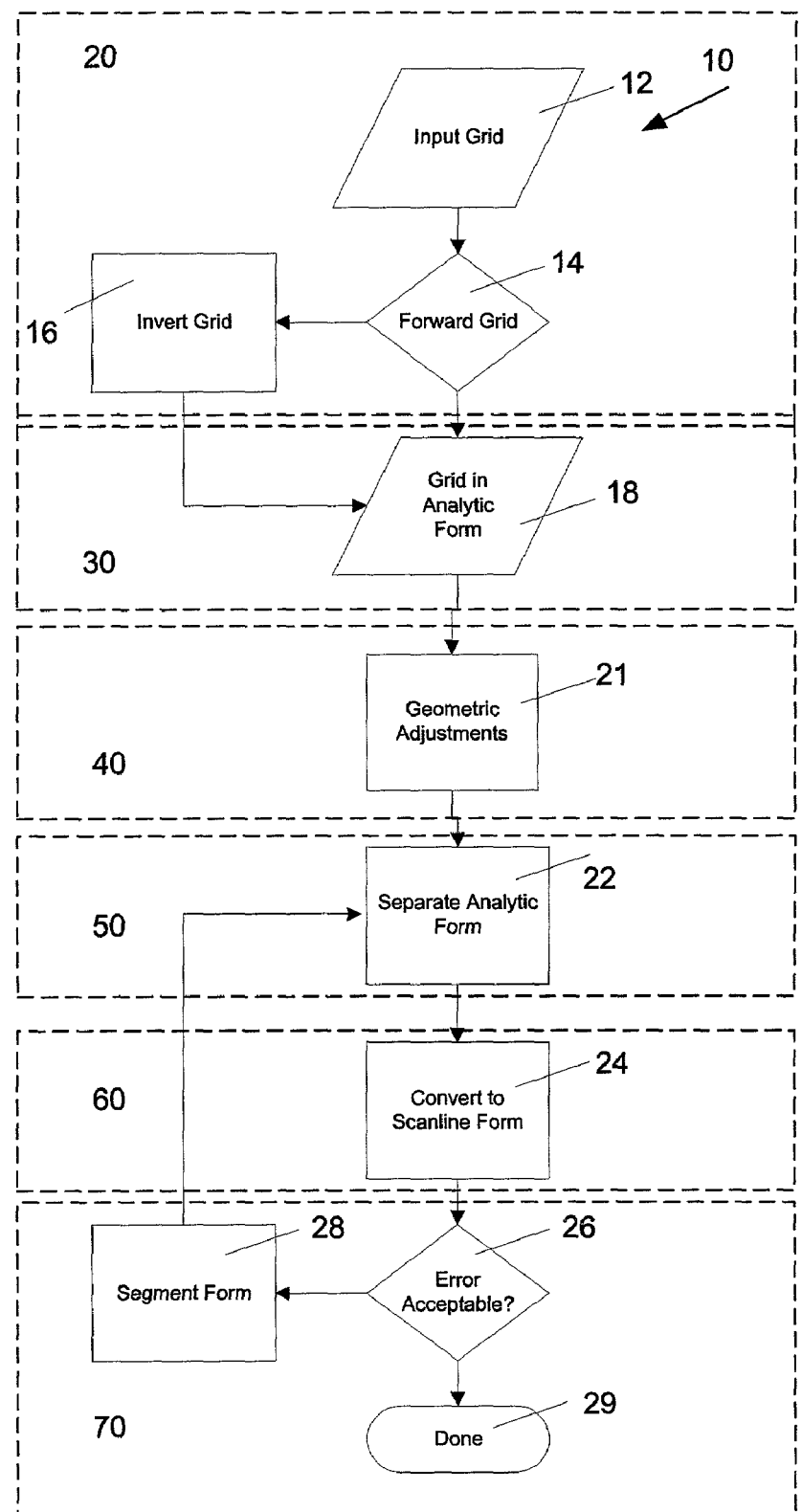
FIG. 1 is a flowchart illustrating the main stages of an example of the image transformation method of the present invention.

FIG. 1 is a detailed flowchart diagram that illustrates the image transformation method 10 used to achieve transformation of an input image to an output image according to a non-linear 2D spatial transformation, according to the present invention. The six main stages of the method are illustrated in FIG. 1, namely a inverse transformation stage 20, an analytical stage 30, a geometric transformation stage 40, a separation stage 50, a conversion stage 60, and a error check stage 70. These stages will be discussed in further detail throughout the following disclosure.

The image transformation method 10 of the present invention provides a separable two-pass transform for processing an image warp in separate horizontal and vertical passes, allowing the 2D spatial transform to be defined as two 1D processes. Accordingly, any system where a 2D spatial transformation needs to be applied can make use of image transformation method 10. Image transformation method 10 can be used in applications that range from correcting small distortions (in projectors, cameras, and display devices), to correcting for perspective (keystone or special wide-angle lens corrections), to a complete change in image geometry (such as forming rectangular panoramas from circular 360 images, or other rectangular to polar type mappings).

While the use of a separable algorithm does not improve the representation of 2D spatial transformations, it makes the transformations more amenable to hardware implementation. Separating the scaling data into vertical and horizontal passes (or datasets), allows for the use of 1D filtering to process the image. Without separation, a 2D filter is needed, which is more complicated and less efficient. While a representation of a 2D transformation in terms of separated datasets is more complicated, better filtering (image quality) is obtained by using 2D filtering rather than 1D, and not all transformations are separable, the hardware benefits associated with the two-pass approach, outweigh these disadvantages. The main benefit of using a one-dimensional spatial transform is a substantial reduction in calculations, and accordingly, a substantially simplified hardware implementation. Further benefits include efficient memory access, the ability to process data in a real-time environment. As will be described, the compact representation of the spatial transforms allows for scalability to the required level of precision.

The grid data description of a geometric (i.e. spatial) transformation defines the mapping of a finite set of points relative to either the input or output image. Image transformation method 10 allows users to map given pixels to certain "landmark" positions (i.e. point mapping) that define the desired geometric transformation such as those available from a ray trace of an optical system. While it is possible to represent a geometric transformation in an analytical form, the required number of user parameters grows quickly when non-linear warps are required. Since most hardware implementations of warping restrict the model or "form" of warping possible (representing the warp with polynomial functions for example) only a finite number of point mappings are required to uniquely specify the geometric transformation. As an example, if the hardware defines a warp as a bi-variate polynomial of order four then a grid of 5×5 point mappings is sufficient to uniquely specify a geometric transformation. Although the inverse map is a useful concept in hardware implementation, allowing the user to define the geometric transformation in a forward map is important since the user naturally considers the geometric transformation as one in which the input image is mapped to an output image. In some situations, obtaining the inverse data may not be possible as not all destination points have known mapping to source locations. In such a case, it is useful to model a forward or inverse 2D map as two surface maps.

During the inverse transformation stage 20, at step (12), the transformation input grid is provided by the user. The input grid is a list of input to output (forward map) or output to input (inverse) transformations. For example:

- 
- 
- $(x_{i-1}, y_{i-1}) \rightarrow (u_{i-1}, v_{i-1})$
$(x_i, y_i) \rightarrow (u_i, v_i)$
$(x_{i+1}, y_{i+1}) \rightarrow (u_{i+1}, v_{i+1})$
- 
- for an inverse map and:

- 
- 
- $(u_{i-1}, v_{i-1}) \rightarrow (x_{i-1}, y_{i-1})$
$(u_i, v_i) \rightarrow (x_i, y_i)$
$(u_{i+1}, v_{i+1}) \rightarrow (x_{i+1}, y_{i+1})$
- 
- for a forward map.

Figure 2:
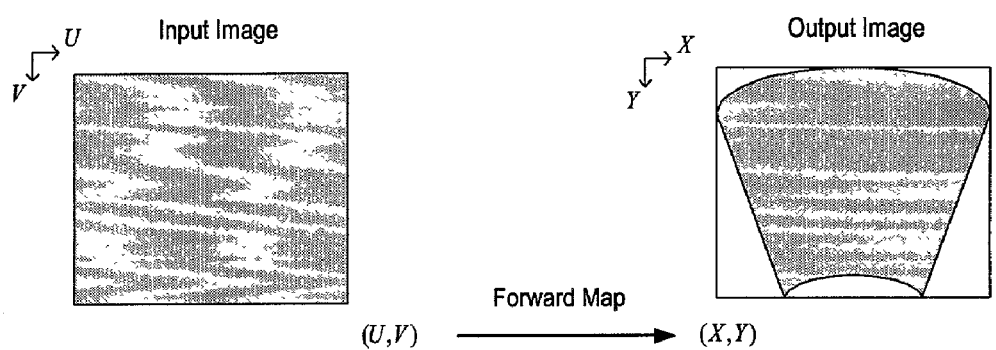
FIG. 2 is graphical representation of a 2D transformation in both forward and inverse form.
Figure 2:
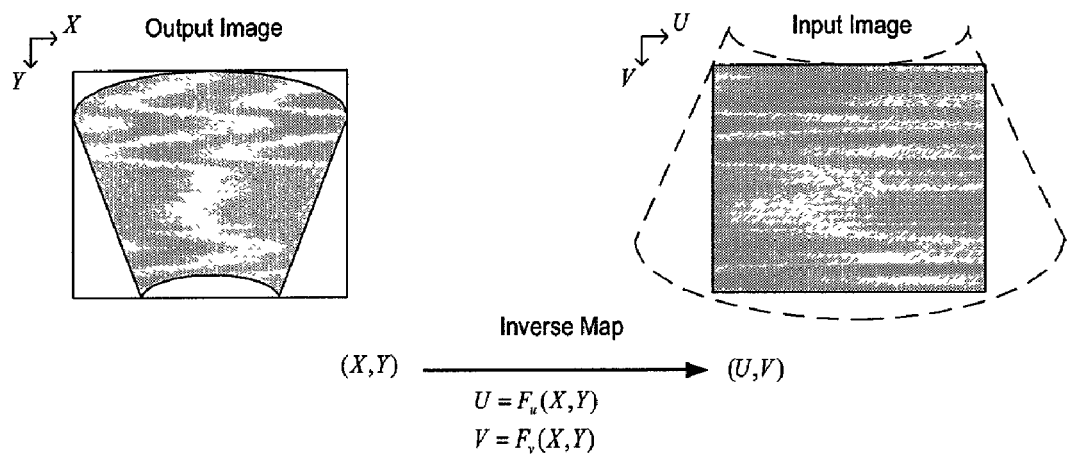

At step (14), it is determined whether the geometric transformation is a forward transformation, and if so then the transformation is converted into an inverse transformation at step (16). FIG. 2 is a graphical representation of a 2D transformation in both forward and inverse form. A forward map will map integer input pixels to non-integer pixels in the output and as such is difficult to implement as each output pixel would be the result of accumulated input pixels whose partial values would have to be stored. An inverse map maps output pixels to non-integer input pixels, which may be interpolated from surrounding input pixels without any additional stored values, it is for this reason the Inverse map is used in the method. The forward map allows a user to specify the warp in a more intuitive way and is the form that is often available from an optical projection, as such it is required that the method support the conversion between forward to inverse maps.

Figure 3A:
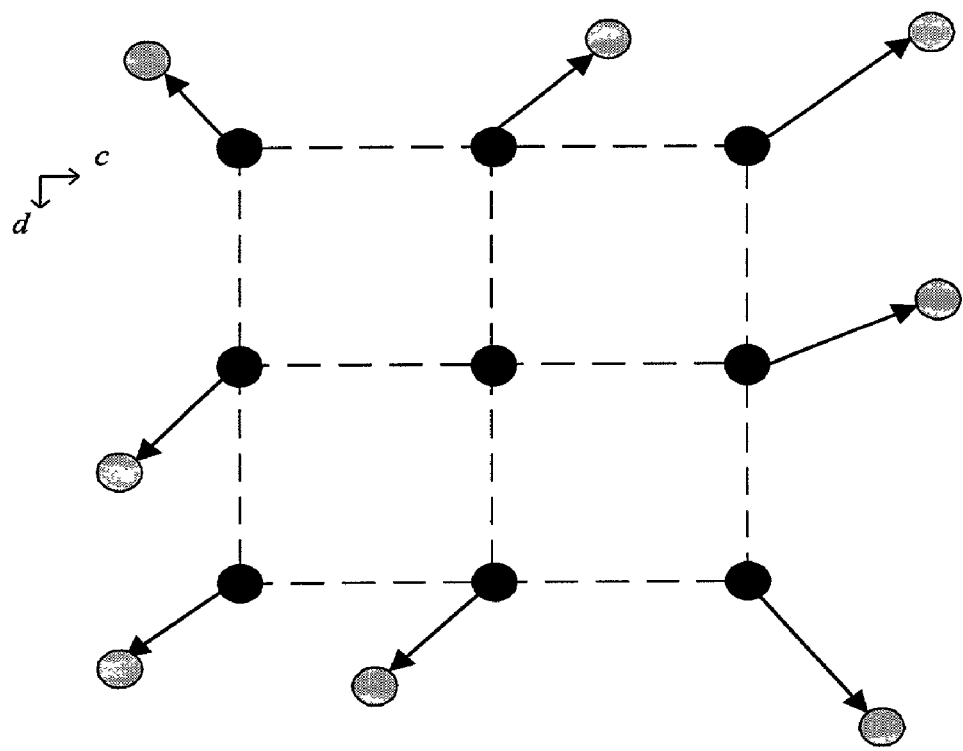
FIG. 3A is a graphical representation of a sample 2D (inverse or forward) warp defined on the domain (c, d)
Figure 3B:
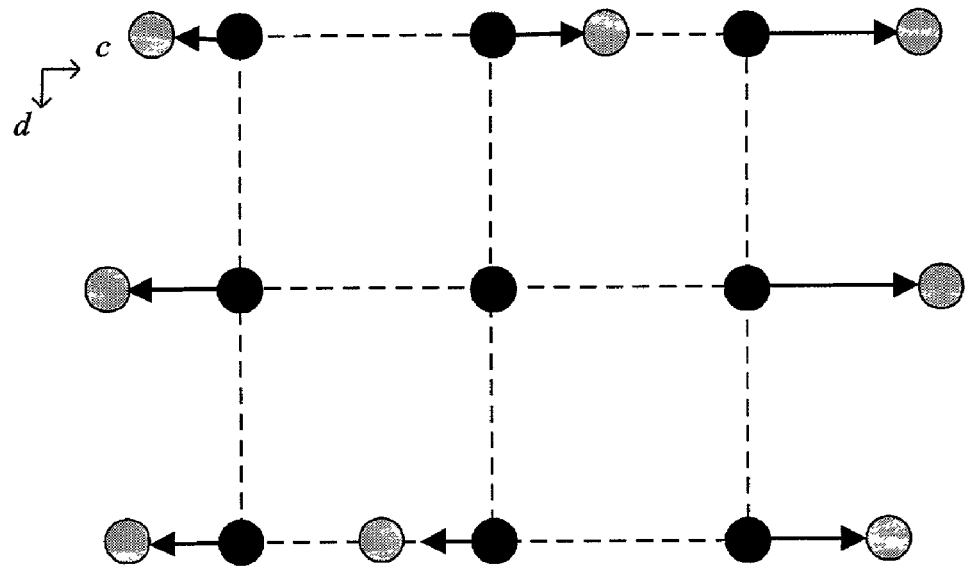
FIG. 3B is a graphical representation of the warp from FIG. 3A where the grid points are mapped to points where the d coordinate remains unchanged.
Figure 3C:
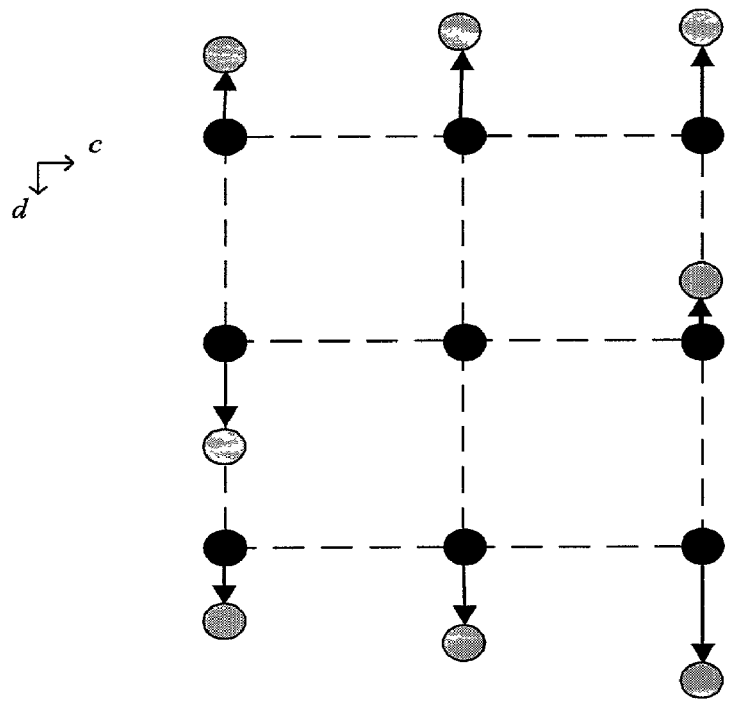
FIG. 3C is a graphical representation of the warp from FIG. 3A where the grid points are mapped to points where the c coordinate remains unchanged.
Figure 3D:
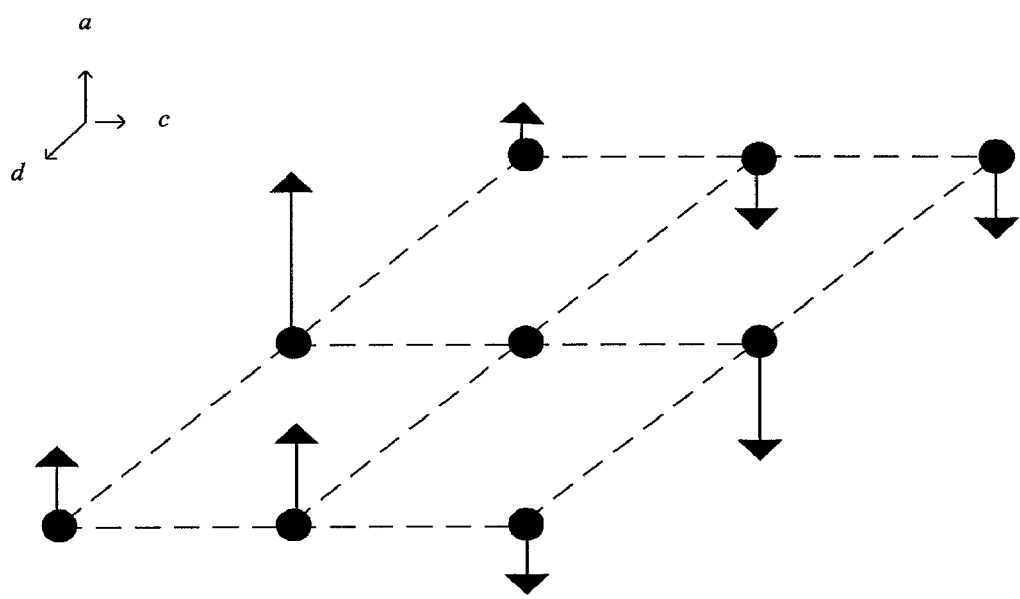
FIG. 3D is a graphical representation of the warp from FIG. 3B represented as a function a=A(c, d)
Figure 3E:
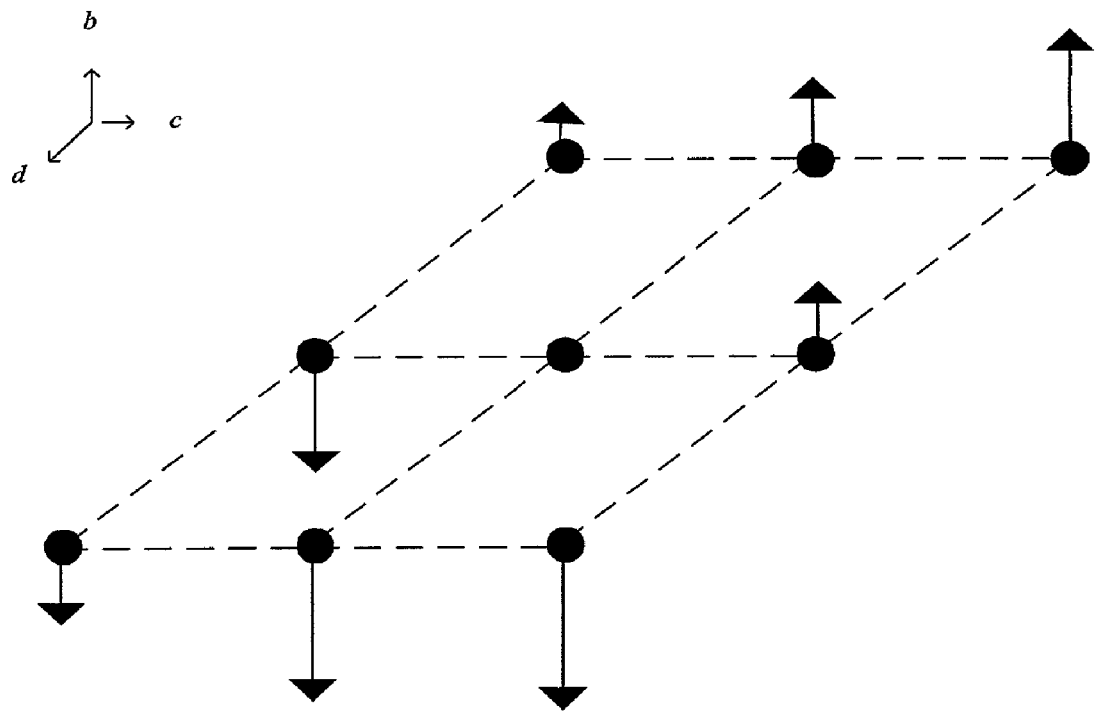
FIG. 3E is a graphical representation of the warp from FIG. 3C represented as the function b=B(c, d)

FIG. 3A illustrates an example 2D image map (inverse or forward) warp defined on a regular grid of points defined on the domain (c,d). The map illustrated can be considered either a forward or inverse map. FIG. 3B shows an 1D image map that corresponds to the image map of FIG. 3A and which leaves the d coordinate unchanged. As shown, the 1D image map maps the c coordinate to match the original map of FIG. 3A. Conversely, the 1D map shown in FIG. 3C leaves the c coordinate unchanged but maps the d coordinate to match the original map of FIG. 3A. FIGS. 3D and 3E show the maps illustrated in FIGS. 3B and 2C represented as separate surface maps a=A(c,d) and b=B(c,d), respectively. As shown, the original warp of FIG. 3A can now be represented by the mapping (a,b)=(A(c,d), B(c,d)).

Figure 3F:
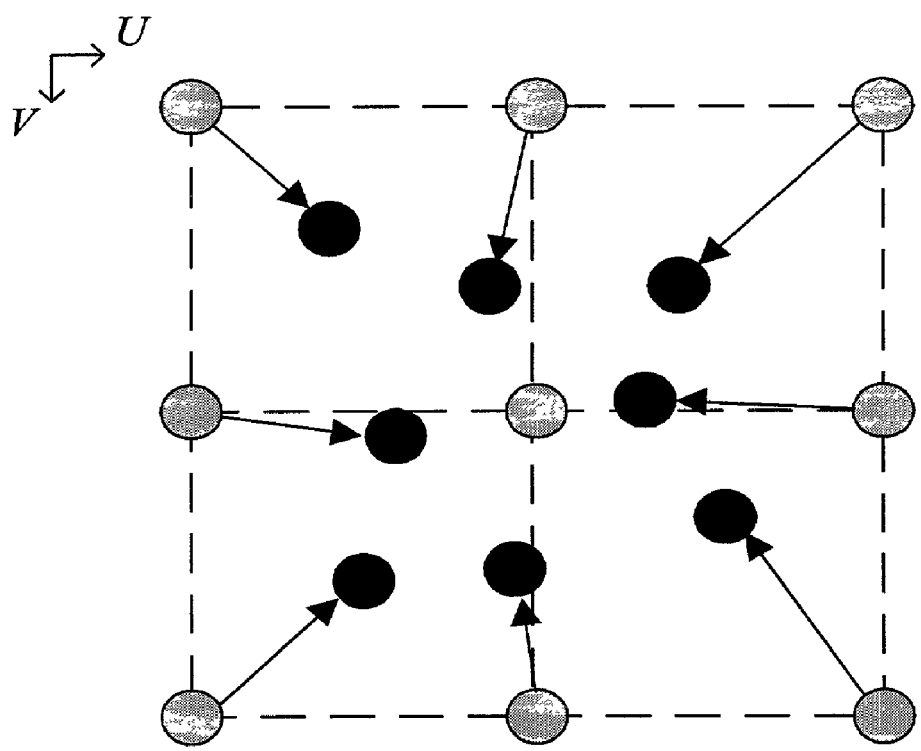
FIG. 3F is a graphical representation of a user defined forward map on a uniform grid of points in the input image mapping to non-integer positions in the output space.
Figure 3G:
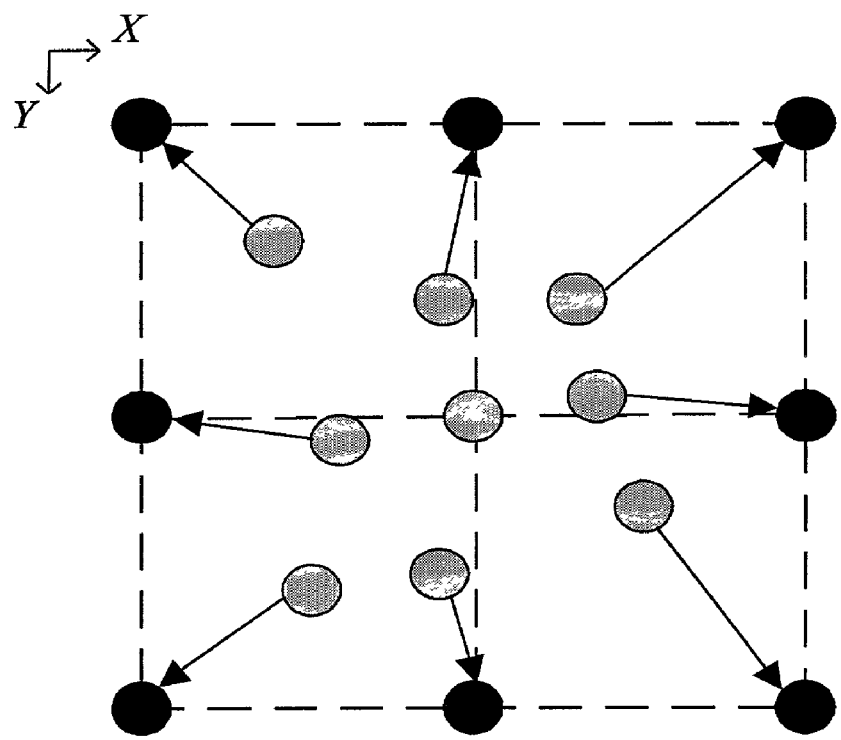
FIG. 3G is a graphical representation of the inverse of the map defined in FIG. 2F.

FIG. 3F shows a user defined forward map on a uniform grid of points (as shown by gray dots) in the input image mapping to non-integer positions in the output space (as shown by black dots). As discussed above, the user specifies a lattice or grid of points in the input image at step (12). Generally, the point mapping to the output image will be on a non-uniform grid. As shown in FIG. 3G the inverse mapping can be determined from the forward mapping by reversing the direction of the arrows which causes the inverse map to be defined on a non-uniform grid of points.

The non-regular inverse map is approximated within image transformation method 10 using a "thin plate spline" radial basis function of the form:

$$s(x) = p(x) + \sum_i \lambda_i \varphi(x - x_i) \tag{1}$$

where $\phi(x-x_i) = r^2 \log(r)$ and $x \in [X,Y]$ and r is given as the radial distance between two dimensional points, p(x) is an additional linear transformation of the image map.

Figure 3H:
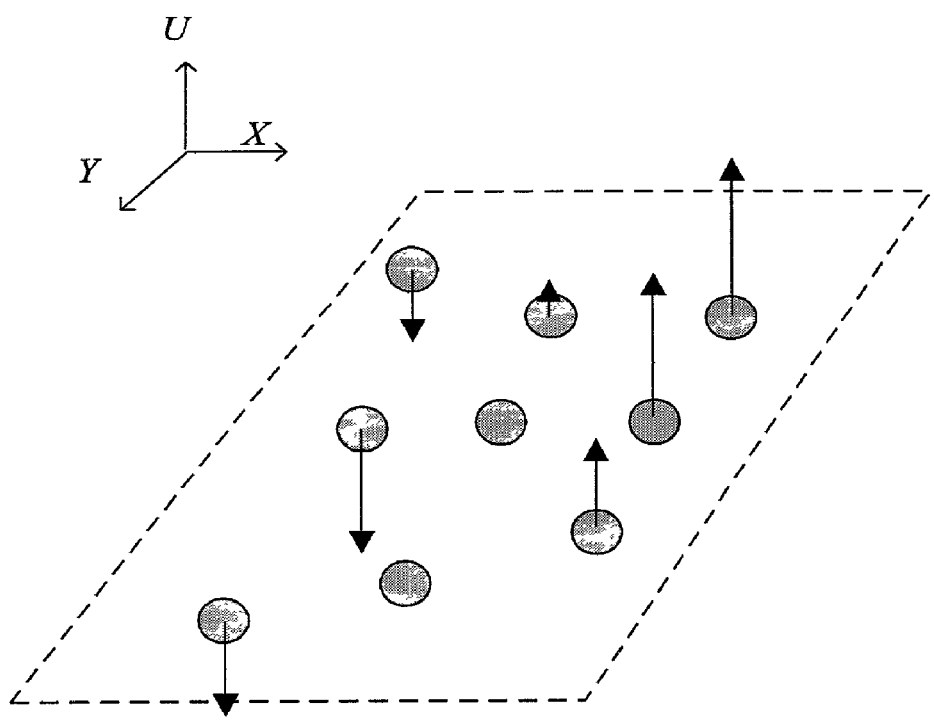
FIG. 3H is a graphical representation of the surface map u=U(x,y) defined on a non-regular grid corresponding to the inverse map in FIG. 3G.
Figure 3I:
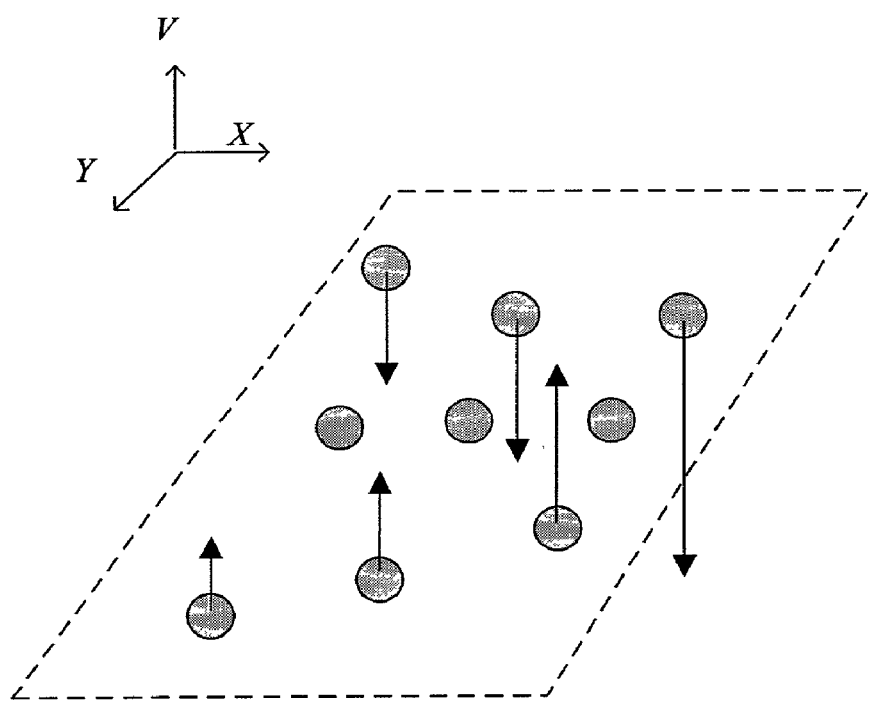
FIG. 3I is a graphical representation of the surface map v=V(x,y) defined on a non-regular grid corresponding to the inverse map in FIG. 3G.

The non-regular inverse map is decomposed into its two surface maps u=U(x,y) and v=V(x,y). However, because the original inverse map was defined on a non-regular grid, the two surface maps will also be defined on a non-regular grid as shown in FIGS. 3H and 31. The map U(x,y) will be fit using the function $$s_u(z) = p(z) + \sum_i \lambda_i \varphi(z - z_i)$$

and the map V(x,y) will be fit using the function $$s_v(z) = p(z) + \sum_i \lambda_i \varphi(z - z_i).$$

Details on the use of radial basis functions for two-dimensional scattered data interpolation are provided in the reference *Radial Basis Function Methods for Interpolation to Functions of Many Variables*, by M. J. D. Powell (Fifth Hellenic-European Conference on Computer Mathematics and it's Applications—September 2001), hereby incorporated by reference.

The function s(x) is sampled on a uniform grid of points to obtain an inverse surface map u=U(x,y) which is defined on a uniform grid. The function $s_v(z)$ is sampled on a uniform grid of points to obtain an inverse surface map v=V(x,y) which is defined on a uniform grid. The functions u=U(x,y) and v=V(x,y) are sampled on a uniform grid in order to simplify the processing required in the analytical stage 30. The radial basis functions are preferred as they tend to be more stable at points of extrapolation that are far from the points of interpolation. Since many points on the inverse map will be defined by extrapolation, this is a useful property of the radial basis functions. The preferred embodiment of the image transformation method 10 uses a forward map defined on a uniform grid to simplify user input, however a forward map defined on a non-uniform grid is handled exactly the same way as the case for the uniform grid, as such the image transformation method 10 already supports forward maps defined on a non-uniform grid.

During the analytical stage 30 at step (18), image projection method 10 converts the inverse warp map generated by inverse transformation stage 20, into an analytical form suitable for further processing. Specifically, the inverse warp map with (x,y) defined on a regular grid (e.g. the map shown in FIG. 5A) is converted to an analytical form which will define the inverse warp map on the entire output image, facilitate additional geometric deformations and aid in separating the inverse warp map.

The 2D warp map is represented by two surface functions $u=U(x,y)$ and $v=V(x,y)$ as discussed above. Using the well known techniques of spline interpolation/approximation on regular grids, we can represent the inverse transformation $(u,v)=(U(x,y), V(x,y))$ in the form $$u=U(x,y)=\Sigma\Sigma a_{ij}N_i(x)N_j(y)$$

$$v=V(x,y)=\Sigma\Sigma b_{ij}N_i(x)N_j(y) \quad (2)$$

where $N_i(x)$ and $N_j(y)$ are conventionally known spline basis functions. Additional details on these functions are provided in the reference Geometric Modeling, by Wiley 1997, herein incorporated by reference. There are several benefits of using spline basis functions. First, the number of spline pieces can be adjusted according to the complexity of the warp that has been defined. Second, the spline pieces can be joined in a smooth or un-smooth manner as described by the warp. For example it is possible to represent tears in the warp by not requiring continuity at the patch boundaries. Third, the spline functions are essentially polynomial functions which can be easily evaluated in hardware.

During the geometric transformation stage 40 at step (21), image transformation method 10 optionally performs a geometric adjustment of the analytic form of the inverse image map. By using the form $(u,v)=(U(x,y), V(x,y))$, where:

$$u=U(x,y)=\Sigma\Sigma a_{ij}N_i(x)N_j(y)$$

$$v=V(x,y)=\Sigma\Sigma b_{ij}N_i(x)N_j(y) \quad (2)$$

it is simple to perform scaling of both the input and output image sizes. To scale the size of the input space for either axis we use the relationship, $$s^*u=s^*U(x,y)=s^*\Sigma\Sigma a_{ij}N_i(x)N_j(y)=\Sigma\Sigma s^* a_{ij}N_i(x)N_j(y)$$

$$t^*v=t^* V(x,y)=t^*\Sigma\Sigma b_{ij}N_i(x)N_j(y)=\Sigma\Sigma t^* b_{ij}N_i(x)N_j(y) \quad (3)$$

where s and t are scale factors of the u,v axis respectively and where $N_i(x)$ and $N_j(y)$ are conventionally known spline basis functions. To scale the size of the output space for either axis we use the relationship:

$$u=U(a^* x,b^*y)=\Sigma\Sigma a_{ij}N_i(a^*x)N_j(b^*y)$$

$$v=V(a^*x,b^*y)=\Sigma\Sigma b_{ij}N_i(a^*x)N_j(b^*y) \quad (4)$$

where a and b are scale factors of the x,y axis respectively. Further details of applying linear transforms to spline functions are available in Geometric Modeling, by Wiley 1997. Scaling of the input and output image sizes allows the user to use an existing forward/inverse map defined for one combination of input/output image size to be used with another input/output image size without having to generate a new forward/inverse map. Other linear operations such as translation and rotation of the analytical form can be used to allow a user adjust a given forward/inverse map without having to generate a new forward/inverse map, this situation might occur in a calibration environment where a user starts off with a reference map which requires slight adjustment for that particular environment.

Figure 4:
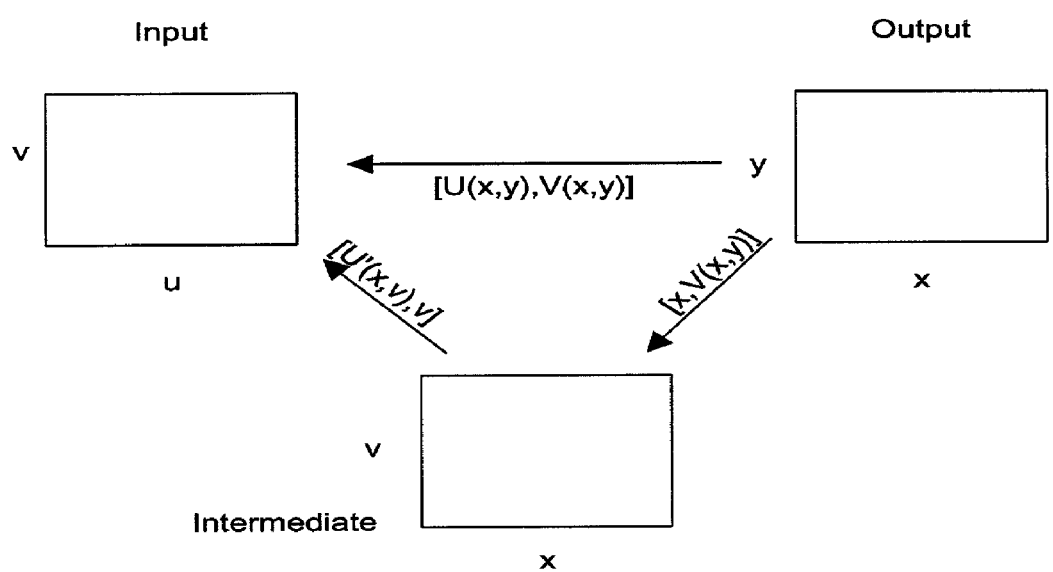
FIG. 4 is a graphical representation of the separation concept for the inverse map that processes first in the horizontal direction then in the vertical direction.

During the separation stage 50 at step (22), the inverse map is separated into two 1D image maps, namely PassOne and PassTwo maps. In order to represent the original warp mapping defined by $(u,v)=(U(x,y), V(x,y))$ as a separable 2-pass transform two warp maps need to be defined, namely $(x,v)=(x, V(x,y))$ and $(u,v)=(U(x,v), v)$, with $u=U(x,v)$ defined so that the composition of these two maps will be equivalent to the original map $(u,v)=(U(x,y), V(x,y))$. The relationship between the maps $(u,v)=(U(x,y), V(x,y))$, $(x,v)=(x, V(x,y))$, and $(u,v)=(U(x,v), v)$ is shown in FIG. 4. It should be noted that the order of separation in the inverse map is reversed to the order of processing, due to the property of functional composition and inverses $(A \circ B)^{-1}=B^{-1} \circ A^{-1}$.

From FIG. 4 it can be seen that $(u,v)=(U'(x,v),v)$ can be derived by inverting $(x,v)=(x,V(x,y))$ (defined by $(x,y)=(x, V'(x,v))$) and composing this mapping with the map $(u,v)=(U(x,y), V(x,y))$. Since $(x,v)=(x,V(x,y))$ keeps x fixed the function $v=V(x,y)$ must be an invertable (monotonic) function in y for a fixed x if the map $(x,v)=(x,V(x,y))$ is to be invertable.

We have the following:

$$(x,v) \to (x, V'(x,v)) \to (x, V(x, V'(x,v)))=(x,v) \quad (5)$$

from the definition of $V'(x,v)$ and $V(x,y) \Rightarrow V(x,V'(x,v))=v$. Then, using the above identity, $(U'(x,v),v)=(U(x,V'(x,v)),v)$:

$$(U'(x,v),v)=U(x,y),V(x,y)) \circ (x,V'(x,v))=(U(x,V'(x,v)),V(x,V'(x,v))) \quad (6)$$

The function $(x,v)=(x,V(x,y))$ is given by using equation (2) the function $(u,v)=(U'(x,v),v)$ can be approximated as follows.

Figure 5A:
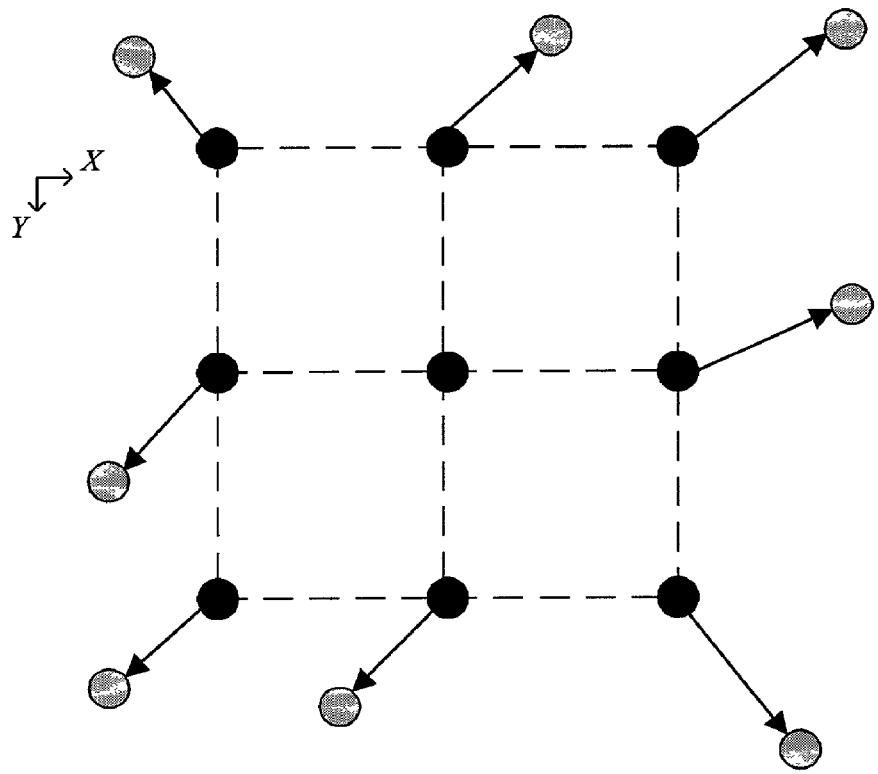
FIG. 5A is a graphical representation of an example sampled inverse warp map where points on a regular grid in the output space are mapped to arbitrary points in the input space.
Figure 5B:
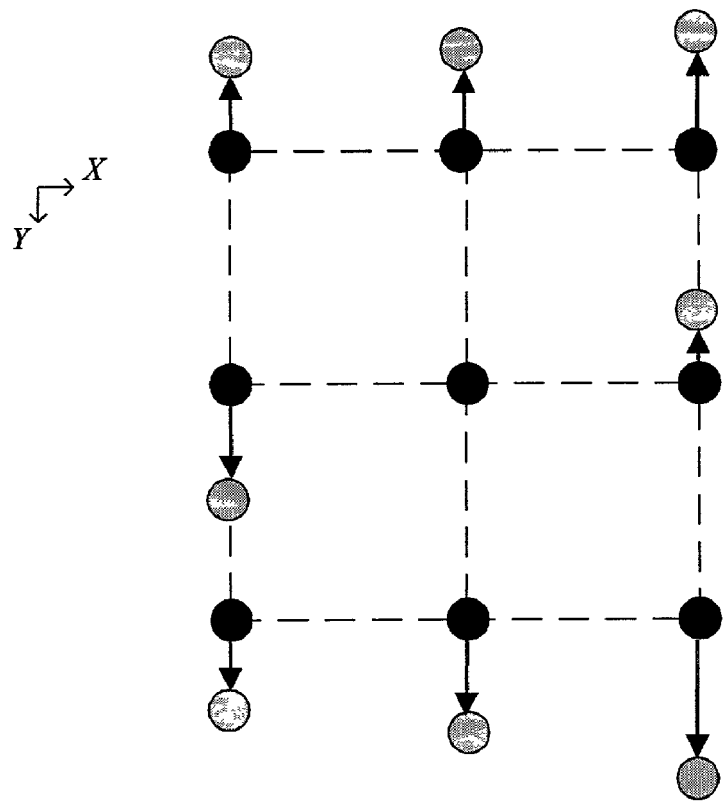
FIG. 5B is a graphical representation of a regular grid on the output space mapped by the function (x, v)=(x, V(x,y)) to arbitrary points on the intermediate space according to the example warp given in FIG. 5A.
Figure 5C:
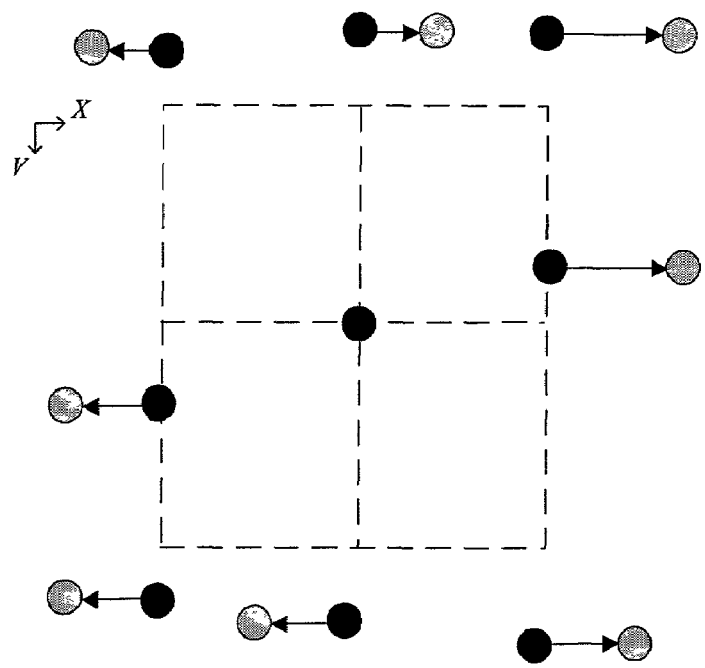
FIG. 5C is a graphical representation of the non-regular points in the intermediate image that have been mapped by the function mapping (u,v)=(U(x,v), v)

FIG. 5A illustrates a 2D inverse map (from black dots to grey dots) sampled by using equations (1) and (2) above. FIG. 5B shows this grid under the mapping $(x,v)=(x,V(x,y))$. It should be noted that in FIG. 5B the grid points only move in the vertical direction. FIG. 5C shows the non-regular points from FIG. 5B with the mapping $(u,v)=(U'(x,v),v)$ so that the composition of the mappings $(x,v)=(x,V(x,y))$ and $(u,v)=(U'(x,v),v)$ match the original 2D inverse warp shown in FIG. 5A. From FIGS. 5A, 5B and 5C, it can be seen that $(u,v)=(U'(x,v), v)$ is determined by scattered data interpolation where the centers of the points are given by $(x,V(x,y))$ and each point $(x,V(x,y))$ has a value $U(x,y)$. The function $(u,v)=(U'(x,v),v)$ is determined by sampling the scattered data approximation to a uniform grid and fitting the function $U'(x,y)$ with a spline surface as described in analytical stage 30.

Figure 6:
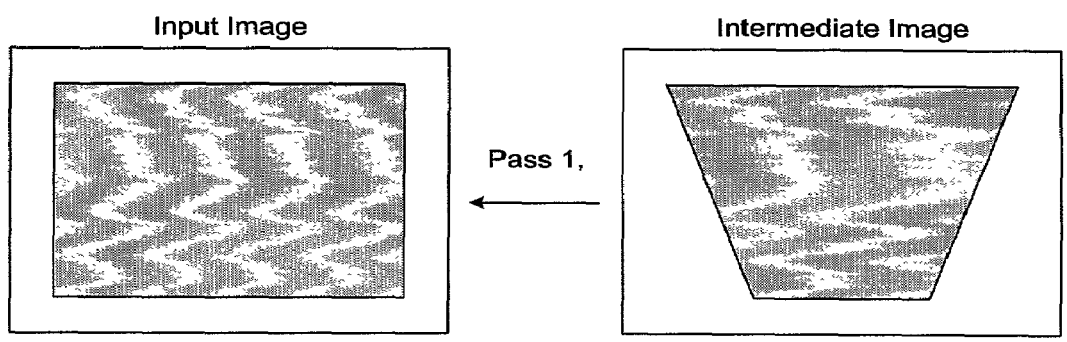
FIG. 6 is a schematic diagram showing the input, intermediate and output images that are generated by the two pass process for the arc-raster transformation shown in FIG. 3.
Figure 6:
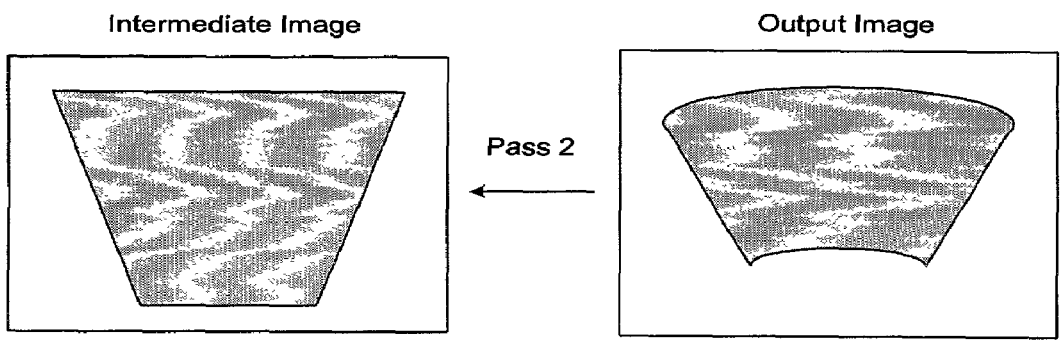

We now have the two functions $u=U'(x,v)$ and $v=V(x,y)$, that is PassOne and PassTwo, respectively, represented in analytical form, respectively:

$$u=U'(x,v)=\Sigma\Sigma a_{ij}N_i(x)N_j(v)$$

$$v=V(x,y)=\Sigma\Sigma b_{ij}N_i(x)N_j(y) \quad (7)$$

where $N_i(x)$ and $N_j(y)$ are spline basis functions. The relationship between the functions (7) and the separable two-pass transform is shown in FIG. 6. The first pass PassOne creates the intermediate image from the input image by using the map $(u,v)=(U'(x,v),v)$. By fixing the value of v and allowing x to vary the map $(u,v)=(U'(x,v),v)$ becomes a mapping of a horizontal line in the intermediate image to a horizontal line in the input image, and so the interpolation becomes a one-dimensional problem. By repeating this process for every value of v in the intermediate image the entire intermediate image can be created. It should be noted that the first pass only changes the horizontal geometry of the input image, while the second pass only changes the vertical geometry of the intermediate image.

The second pass PassTwo creates the output image from the intermediate image by using the map (x,v)=(x,V(x,y)). By fixing the value of x and allowing y to vary the map (x,v)=(x,V(x,y)) becomes a mapping of a vertical line in the output image to a vertical line in the intermediate image, and so the interpolation becomes a one-dimensional problem. By repeating this process for every value of x in the output image the entire output image can be created.

The PassOne and PassTwo maps are converted to conventionally known Target Increments (TarInc) and Offset form. The analytic form for a spline surface is given as:

$$\Sigma\Sigma c_{ij} N_i(x) N_j(y) \quad (8)$$

which can be grouped as:

$$\sum_j \left(\sum_i c_{ij} N_i(x)\right) N_j(y) = \sum_j d_j N_j(y) \quad (9)$$

with $$d_j = \sum_i c_{ij} N_i(x)$$

or alternatively:

$$\sum_j \left(\sum_i c_{ij} N_i(y)\right) N_j(x) = \sum_j d_j N_j(x) \quad (10)$$

with $$d_i = \sum_j c_{ij} N_j(y)$$

and where $N_i(x)$ and $N_j(y)$ are conventionally known spline basis functions. These formulas provide the equations of curves that are embedded in the surface. The grouping implies that the curves are orthogonal to the domain parameters x or y. The form in (9) will give scan-lines or curves in the x parameter on the surface, and form in (10) will give us scan-lines or curves in the y parameter on the surface.

Since the first pass only performs processing in the horizontal or x direction, we represent the function u=U'(x, y)=ΣΣ$a_{ij}N_i(x)N_j(v)$ in the form Σ(Σ$a_{ij}N_j(v)$)$N_i(x)$ that represents the surface as vertical scan-lines. Since the second pass only performs processing in the vertical direction we represent the function u=V(x,y)=ΣΣ$a_{ij}N_i(x)N_j(y)$ in the form Σ(Σ$a_{ij}N_i(x)$)$N_j(y)$ that represents the surface as vertical scan-lines.

The number of scan-line equations required for each pass can be reduced by approximating the surface by a "ruled-surface", which uses interpolation between scan-lines. Linear interpolation can be implemented if the differences between anchor scan lines are small and precision is maintained. An alternative to using linear interpolation would be to evaluate the surfaces in conventionally known tensor form in which case no approximation is performed.

Image warping requires a positional mapping as well as a "local scale factor" in order to determine a local warp at a given output pixel. The position mapping and "local scale factor" can be combined by using a concept of an Offset and TarInc value that together give the positional mapping as well as a "local scale factor". The scan line functions for each pass in the form $$\sum_j c_{ij} N_j(t)$$

must be represented in a way that allow for the generation of TarInc values.

Figure 7:
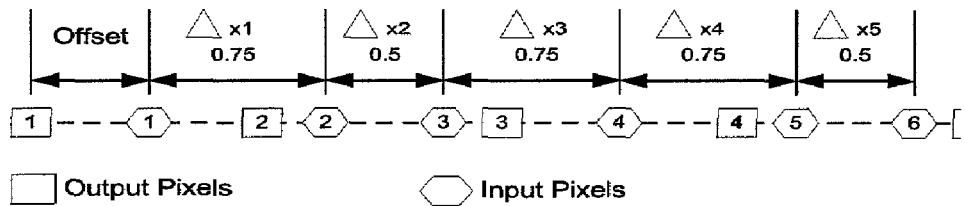
FIG. 7 is a schematic diagram illustrating a scan-line mapping and it's relationship to the concept of a Target Increment (TarInc) and Offset.

FIG. 7 shows a scan-line $v_i$ function (evaluated at each pixel in the scan-line), and it's representation as an Offset and a sequence of TarInc values. The Offset and TarInc sequences for each scan-line are represented as piecewise polynomials, which are similar scan-line functions of the form $$\sum_j c_{ij} N_j(t).$$

The Offset value for each scan-line will be determined by evaluating a polynomial O(a) while each scan-line's TarInc values will be determined by a polynomial T (b).

Given a scan-line mapping function x(t) (i.e. where the scan-line variable is fixed), the difference operator Δ is defined by:

$$\Delta x(b) = x(b+1) - x(b)$$

$$x(b+1) = x(b) + \Delta x(b)$$

Figure 8:
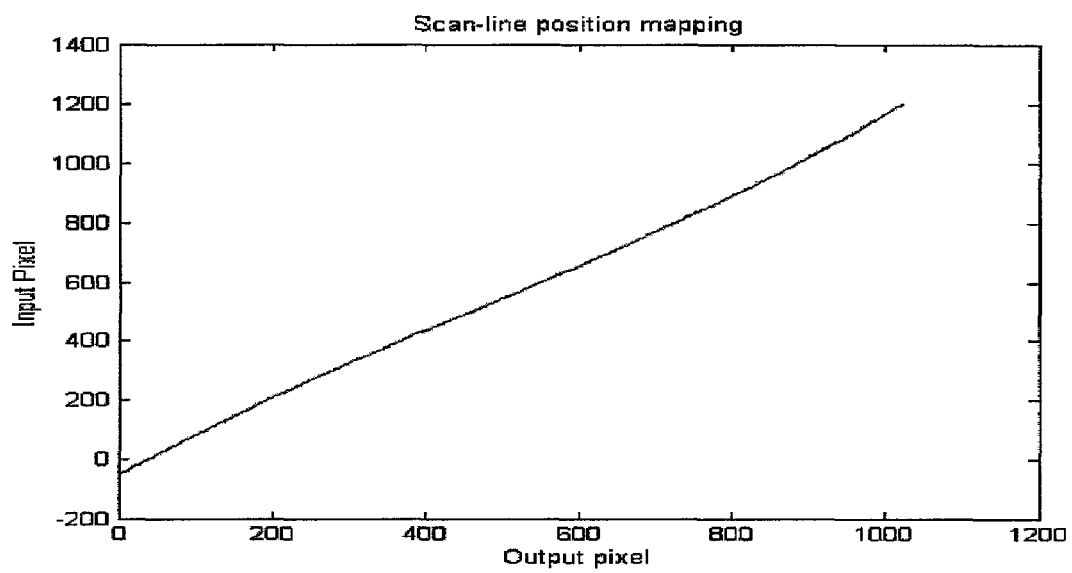
FIG. 8 is a graphical representation of the inverse spatial mapping and the differential TarInc curve.
Figure 8:
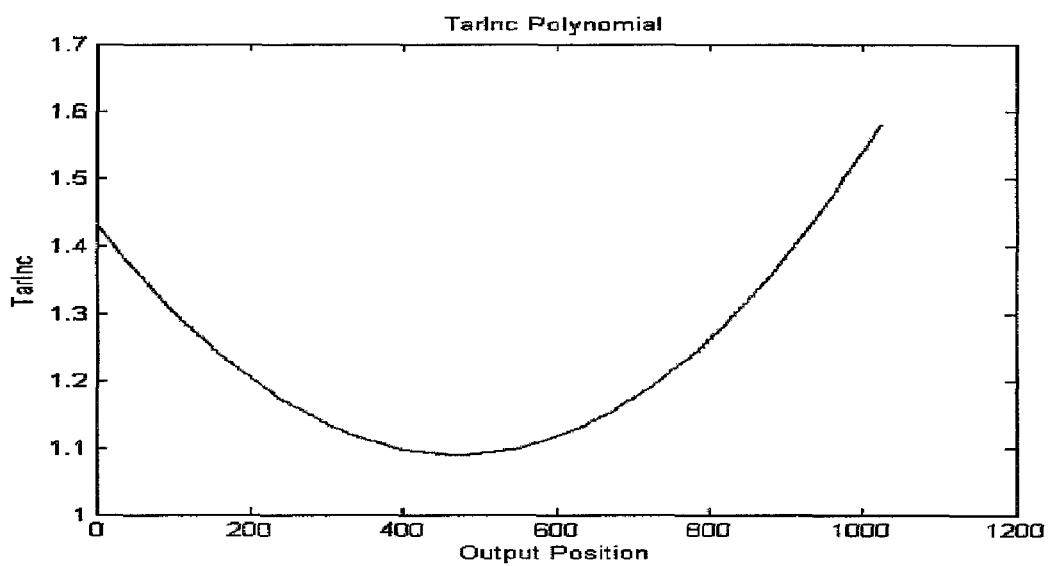

The last equation indicates that the next function value is a combination of the current value plus some delta. The difference operator function Δx(b) can be defined as an $n^{th}$-order polynomial, with the form:

$$\Delta x(b) = p_1 t^n + p_2 t^{n-1} + \ldots + p_n t + p_{n+1}$$

in which $p_n$ are the polynomial coefficients. This function definition can be used to model the space between domain target pixels in terms of the range source spacing. This implies that Δx(b)=T(b) and defines all target increments along the domain. An example is given in FIG. 8, the first graph shows a scan-line mapping which would correspond to a function $$\sum_j c_{ij} N_j(t)$$

the second graph shows the function after application of the difference operator. An advantage of using this form is that the hardware to evaluate the TarIncs is simpler than the hardware required to evaluate the position function directly. As the difference operator reduces the order of a polynomial by one, a TarInc scan-line will require less computation to evaluate than the original scan-line. All that remains is showing the relationship between the functions: U'(x,v) =ΣΣa_{ij}N_i(x)N_j(v), V(x,y)=ΣΣa_{ij}N_i(x)N_j(y), and the Offset and TarInc piecewise polynomial.

Given the first pass mapping and setting x=0 allows for the definition of a boundary curve of the surface. As the surface has been represented using spline patches, the boundary curve is already in a piecewise polynomial format and no additional work needs to be done. So we have O(v)=U'(0,v)=Σa_{oj}N_j(v) where O(v) is the offset polynomial for the first pass of the separable two-pass transform. The mapping U'(x,v) in scan-line form as defined by (9) is already in piecewise polynomial form, by applying the difference operator to each scan-line function we have a TarInc piecewise polynomial for that scan-line.

Given the second pass scan-line position mapping V(x,y) and setting y=0 we have V(x,0)=Σa_{io}N_i(x) which defines a boundary curve of the surface V(x,y). As we represented the surface using spline patches the boundary curve is already in a piecewise polynomial format and no additional work needs to be done. As we represented the surface using spline patches the boundary curve is already in a piecewise polynomial format and no additional work needs to be done. So we have O(y)=V(x,0)=Σa_{io}N_i(x) where O(y) is the offset polynomial for the second pass of the separable two-pass transform O(y) is the offset polynomial for the second pass of the separable two-pass transform. The mapping V(x,y) in scan-line form as defined by (10) is already in piece-wise polynomial form, by applying the difference operator to each scan-line function $$\sum_j c_{ij} N_j(y)$$

we have a TarInc piece-wise polynomial for that vertical scan-line.

Figure 9:
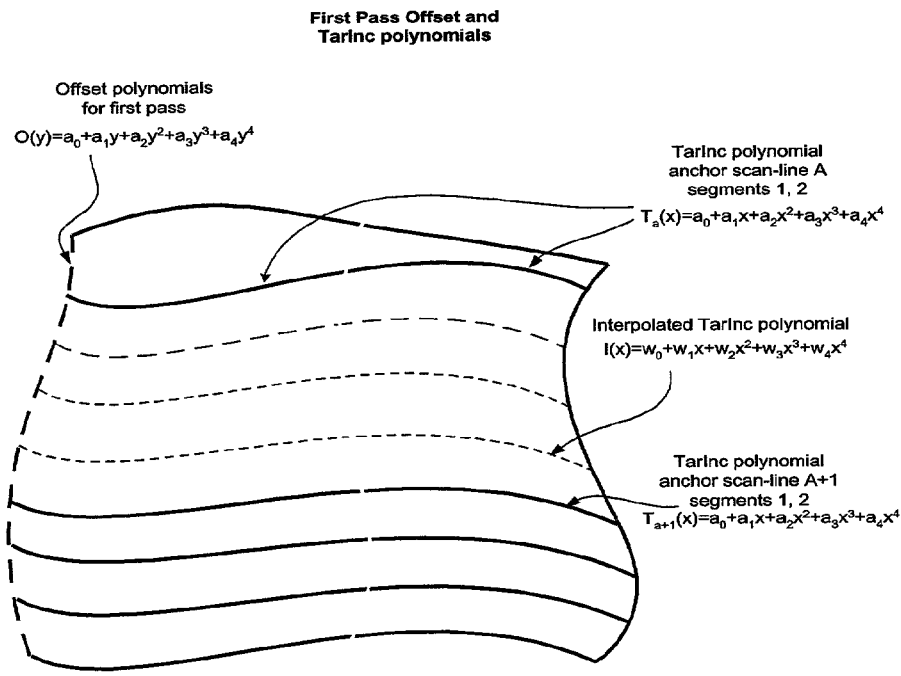
FIG. 9 is a graphical representation illustrating the relationship and orientation of the Offset and TarInc polynomials in the first pass.
Figure 10:
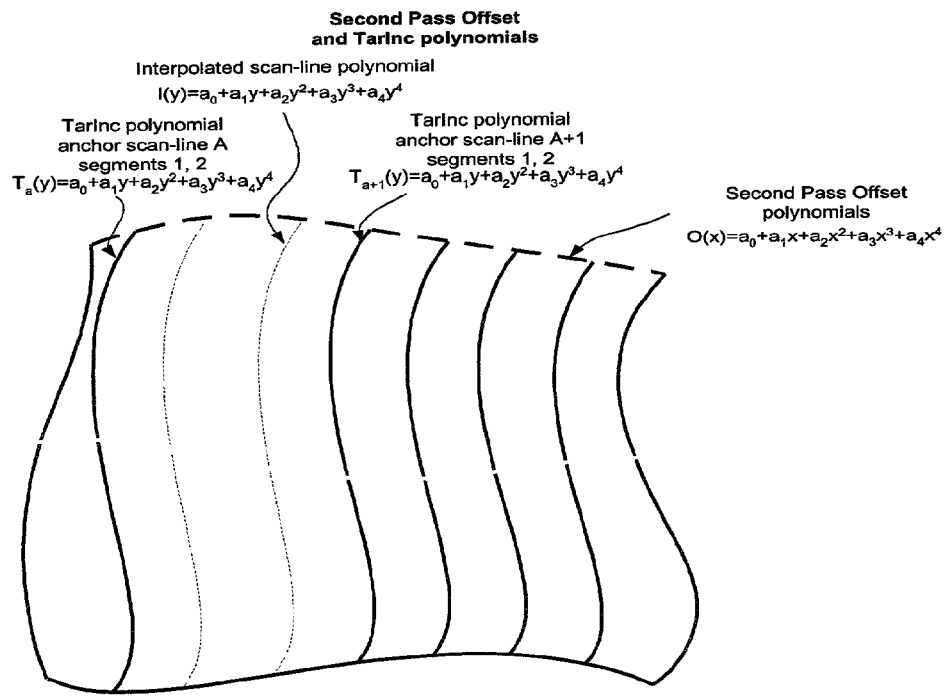
FIG. 10 is a graphical representation illustrating the relationship and orientation of the Offset and TarInc polynomials in the second pass.

FIGS. 9 and 10 show the relationship between the TarInc and Offset, and interpolated TarInc polynomials for the first and second pass on the two pass algorithm. It is possible to use the scan-line position mapping given in the form $$\sum_j c_{ij} N_j(t)$$

directly with an alternative image filtering apparatus, however in this case we also need to supply the "local scale factor" to the apparatus as well. One way to provide the local scale factor is to use an additional scan-line polynomial in the form $$\sum_j c_{ij} N_j(t)$$

that represents the derivative of the positional scan-line. Spline functions allow for a simple manipulation of the positional spline coefficients to generate the derivative spline coefficients. Another issue with using the scan-line position mapping directly is that the initial starting point for interpolated scan-lines will not be explicitly given as in the Offset/TarInc case, but instead will depend on the method used to determine the interpolated scan-lines.

Figure 11:
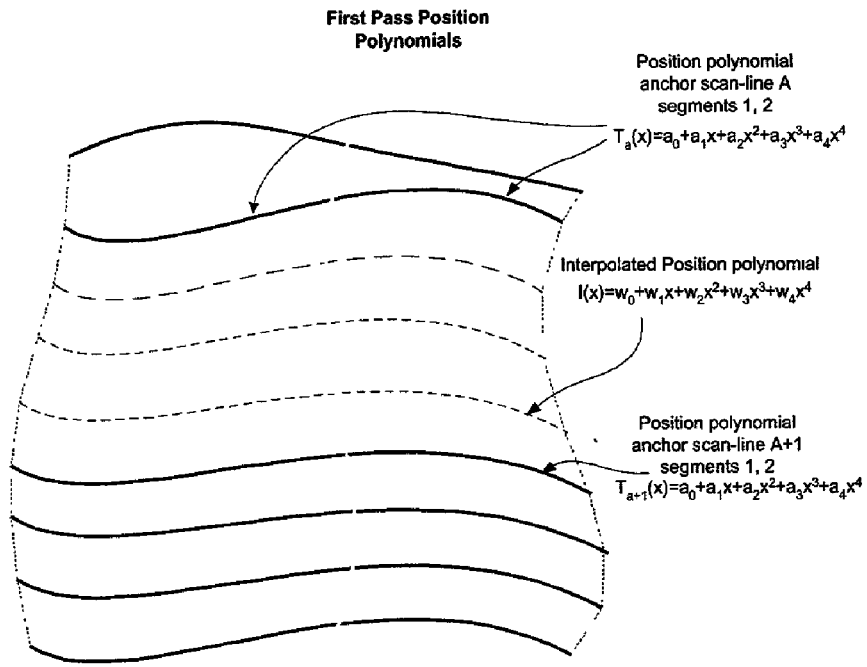
FIG. 11 is a graphical representation illustrating a positional polynomial warp map in the first pass using two position polynomials per scan-line.
Figure 12:
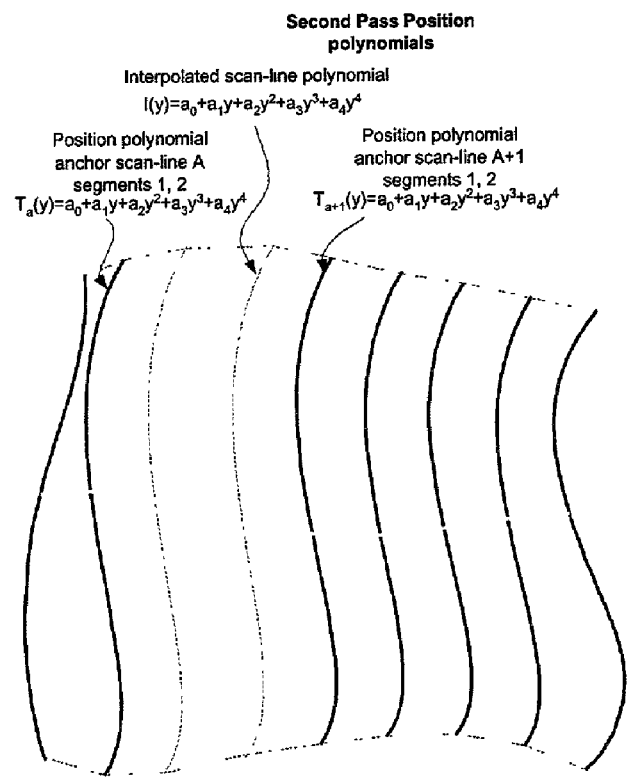
FIG. 12 is a graphical representation illustrating a positional polynomial warp map in the second pass using two position polynomials per scan-line.

An example of an interpolated scan-line case without using Offset or TarInc functions is shown in FIGS. 11 and 12. Note that in FIG. 9 the left edge of the map is determined by an Offset function while in FIG. 11 the left edge of the map is determined by the scan-line and the chosen interpolation method. Note that in FIG. 10 the top edge of the map is determined by an Offset function while in FIG. 12 the top edge of the map is determined by the scan-line and the chosen interpolation method. This may cause visual artifacts at image edges and will make piecing multiple warped images together more difficult since there is no simple control of the warp at the boundary curves.

Figure 13:
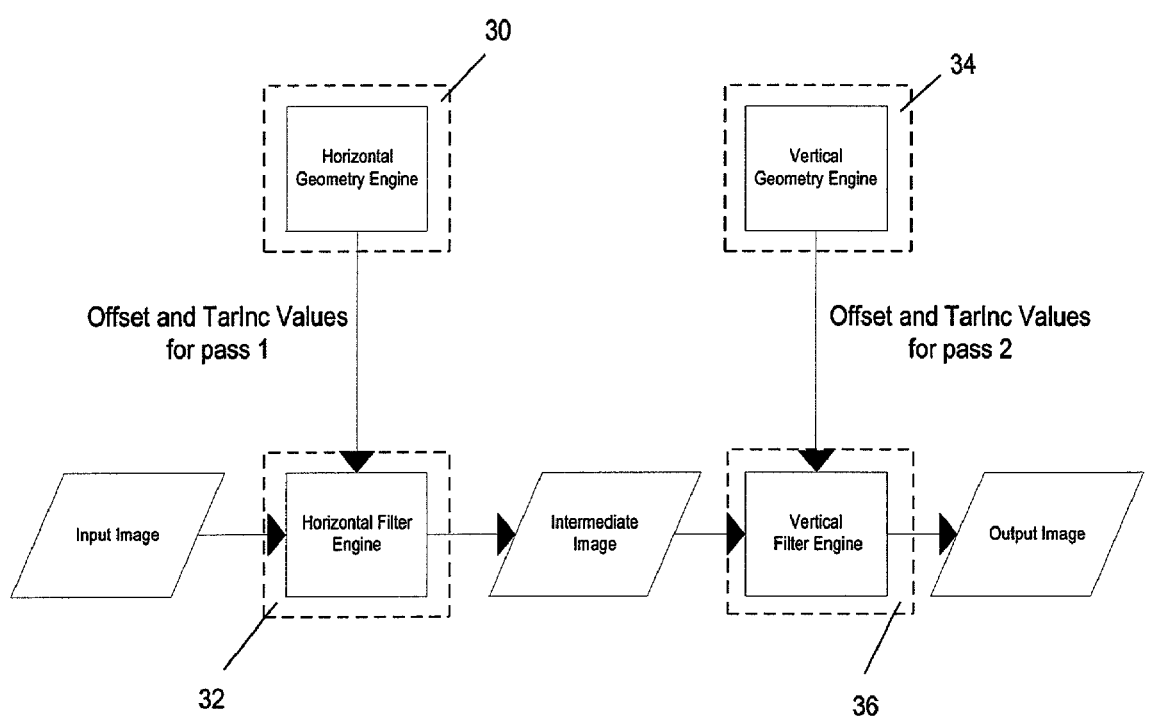
FIG. 13 illustrates an exemplary embodiment of scan line processing.

FIG. 13 illustrates a hardware implementation that can use the scan-line form of the warp from "convert to scan-line form stage 60 " The implementation includes a horizontal geometry engine 30, a vertical geometry engine 34, a horizontal filter engine 32 and a vertical filter engine 36 . Horizontal geometry engine 30 uses the scan-line form of the first pass to generate the required data for horizontal filter engine 32 . FIG. 14 shows an example of the data that is generated by this block. Vertical geometry engine 34 uses the scan-line form of the second pass to generate the required data for vertical filter engine 36 . FIG. 14 shows an example of the data that is generated by this block. The data shown in FIG. 14 includes information on the spacing between the scan-lines the polynomial coefficients for the Offset and TarInc polynomials and the number of scan-lines in each pass. Horizontal and vertical filter engines 32 and 36 are fully described in U.S. Pat. No. 5,594,676 to Greggain et al. which is hereby incorporate by reference.

During the error check stage 70, the error difference between the analytic non-separable form of the warp given by (2) and the output of the convert to scan-line form stage 60 is determined. Specifically, given the scan-line based description of the separated warp it is possible to evaluate the warp at each pixel for the two passes and compare the result to the original forward or inverse non-separable warp as defined by (2). The error could be due to the fact that the analytic form of the non-separable warp given by (2) was not sampled on a sufficiently dense uniform grid as an input to the separate analytical form stage 50, in this case the sampling of the analytic form (2) is done on an increasingly dense uniform grid until an accepted tolerance is reached. The error could also be caused by approximation error when fitting the sampled approximate separable form in (3). In this case the spline basis function can be subdivided to increase the number of polynomial pieces used and or increase the order of the polynomial pieces used. Another source of error could be interpolation error between scan-lines. In this case the solution is to increase the number of scan-lines used until an acceptable error is found. A simple method would be to add scan-lines half way between existing scan-lines. This may result in not using any interpolated scan-lines at all and in effect evaluating (7) directly.

As will be apparent to those skilled in the art, various modifications and adaptations of the structure described above are possible without departing from the present invention, the scope of which is defined in the appended claims.

What is claimed is:

1. An electronic method for non-linear two-dimensional (2D) digital image transformation of an input image having a plurality of input pixels onto an output image having a plurality of output pixels, said method comprising:
    (a) determining the inverse of the non-linear 2D geometrical transformation to form an inverse 2D geometrical transformation;

(b) converting the inverse 2D geometrical transformation into an analytical inverted 2D geometrical transformation;
(c) separating the analytical inverse 2D geometrical transformation into a first and second 1D geometrical transformations;
(d) representing said first and second 1D geometrical transformations as transformation surfaces;
(e) approximating said surfaces of (d) with offset polynomials and target increment polynomials for hardware implementation; and
(f) comparing an evaluation of said first and second 1D geometrical transformations at each pixel with an evaluation of the analytical inverse 2D geometrical transformation at each pixel and repeating steps (c), (d) and (e) until said evaluation meets a predetermined level of performance.

2. The method of claim 1, further comprising the step of performing a geometric transformation on the inverse map, between steps (b) and (c).

3. The method of claim 1, wherein said inverse 2D geometrical transformation must be defined on a uniform point mapping grid.

4. The method of claim 1, wherein said inverse 2D geometrical transformation is applied in combination with a scaling map.

5. An electronic system for non-linear two-dimensional (2D) digital image transformation of an input image having a plurality of input pixels onto an output image having a plurality of output pixels, said system comprising:
(a) a processor to determine the inverse of the non-linear 2D geometrical transformation to form an inverse 2D geometrical transformation;
(b) a converter, coupled to said processor, to convert the inverse 2D geometrical transformation into an analytical inverted 2D geometrical transformation;
(c) a separator, coupled to said converter, to separate the analytical inverse 2D geometrical transformation into first and second 1D geometrical transformations;
(d) a surface function estimator, coupled to said separator, to represent said first and second 1D geometrical transformations as transformation surfaces;
(e) a fitting stage, coupled to said surface function estimator, to approximate said surfaces of (d) with offset polynomials and target increment polynomials for hardware implementation; and,
(f) an error analysis stage, coupled to said filling stage, to compare an evaluation of said first and second 1D geometrical transformations at each pixel with an evaluation of the analytical inverse 2D geometrical transformation at each pixel and to repeat steps (c), (d) and (e) until said evaluation meets a predetermined level of performance.

6. The image transformation system of claim 5, further comprising a geometrical module coupled to the processor for performing a geometric transformation on the inverse map.

7. The image transformation system of claim 5, wherein said inverse 2D geometrical transformation must be defined on a uniform point mapping grid.

8. The image transformation system of claim 5, wherein said inverse 2D geometrical transformation is applied in combination with a scaling map.

9. The method of claim 1, wherein the offset and target increment polynomials are sampled on a uniform grid for economic hardware implementation, and wherein at each given position, said polynomials are interpolated to estimated the value of these polynomials at the given position.

10. The method of claim 1, wherein each 1D geometrical transformation in (d) is divided into segments and for each segment, the transformation is computed separately.

11. The method of claim 10, wherein the degree of the offset polynomials and the degree of the target increment polynomials in each segment is determined according to the complexity of the geometrical transformation in that segment.

12. The method of claim 1 used for optical and geometric distortion correction of an image acquisition system.

13. The method of claim 1 used for optical and geometric distortion correction of an image display system.

14. The method of claim 1 used for optical and geometric distortion correction of a combined image acquisition and image display system.

15. The system of claim 5, further adapted to sample the offset and target increment polynomials on a uniform grid for economic hardware implementation, at each given position, adapted to interpolate said polynomials to estimate the value of these polynomials at the given position.

16. The system of claim 5, further adapted to divide each 1D geometrical transformation in (d) into segments and for each segment, to compute the transformation separately.

17. The system of claim 16, further adapted to determine the degree of the offset polynomials and the degree of the target increment polynomials in each segment according to the complexity of the geometrical transformation in that segment.

18. The system of claim 5 adapted for optical and geometric distortion correction of an image acquisition system.

19. The system of claim 1 adapted for optical and geometric distortion correction of an image display system.

20. The system of claim 1 adapted for optical and geometric distortion correction of a combined image acquisition and image display system.

* * * * *

UNITED STATES PATENT AND TRADEMARK OFFICE
CERTIFICATE OF CORRECTION

| | | |
|---|---|---|
| PATENT NO. | : 7,126,616 B2 | Page 1 of 1 |
| APPLICATION NO. | : 10/167375 | |
| DATED | : October 24, 2006 | |
| INVENTOR(S) | : Tomislav Jasa, Zorawar S. Bassi and Louie Lee | |

It is certified that error appears in the above-identified patent and that said Letters Patent is hereby corrected as shown below:

Claim 5, column 13, line 47, delete "filling", insert --fitting--.

Signed and Sealed this

Eighth Day of May, 2007

JON W. DUDAS
*Director of the United States Patent and Trademark Office*